US010427608B2

(12) United States Patent
Robertson et al.

(10) Patent No.: US 10,427,608 B2
(45) Date of Patent: Oct. 1, 2019

(54) CARGO BED ARTICLE STOWAGE STRUCTURE (71) Applicant: Textron Inc., Providence, RI (US)

(72) Inventors: Candice Robertson, Gilbert, SC (US);
Matthew Zaremba, Evans, GA (US);
Deidra Glymph, Saluda, SC (US);
Marissa Swart, Martinez, GA (US)

(73) Assignee: Textron Innovations Inc., Providence, RI (US)

( * ) Notice: Subject to any disclaimer, the term of this patent is extended or adjusted under 35 U.S.C. 154(b) by 423 days.

(21) Appl. No.: 15/198,215

(22) Filed: Jun. 30, 2016

(65) Prior Publication Data

US 2018/0001827 A1     Jan. 4, 2018

(51) Int. Cl.
*B60R 7/02*     (2006.01)
*B62D 33/02*    (2006.01)

(52) U.S. Cl.
CPC ............... *B60R 7/02* (2013.01); *B62D 33/02* (2013.01)

(58) Field of Classification Search
CPC .............. B60R 7/05; B60R 7/02; B62D 33/02
USPC .................. 296/37.6, 183.1, 183.2
See application file for complete search history.

(56) References Cited

U.S. PATENT DOCUMENTS

| | | | | |
|---|---|---|---|---|
| 4,260,091 A * | 4/1981 | French | ............. | B60R 7/14 224/311 |
| 4,768,822 A * | 9/1988 | Gower | ............. | B60R 13/01 248/231.9 |
| 5,784,769 A | 7/1998 | Clare | | |
| 5,915,777 A * | 6/1999 | Gignac | ............. | B60N 3/103 224/543 |
| 6,199,930 B1 * | 3/2001 | Riley | ............. | B60R 11/06 224/404 |
| 6,416,104 B1 | 7/2002 | Fisher et al. | | |
| 6,471,276 B1 * | 10/2002 | Brunsman | ......... | B29C 45/14073 264/257 |
| 6,554,169 B1 * | 4/2003 | Furlong | ............. | B60R 9/00 224/404 |
| 7,371,341 B2 * | 5/2008 | Youngs | ............. | B29C 45/0017 264/238 |
| 7,651,146 B2 * | 1/2010 | Anderson | ............. | B60R 7/02 296/37.6 |
| 8,038,195 B1 * | 10/2011 | Hutcheson | ............. | B60R 9/00 296/136.04 |
| 8,567,650 B2 * | 10/2013 | Read | ............. | B60R 9/065 224/404 |
| 8,857,684 B1 * | 10/2014 | Calvert | ............. | B60R 11/06 224/281 |
| 9,242,680 B2 | 1/2016 | Schwab | | |
| 2009/0127886 A1 | 5/2009 | Stortzum | | |
| 2009/0200823 A1 * | 8/2009 | Vertanen | ............. | B60P 3/40 296/26.08 |

* cited by examiner

*Primary Examiner* — Jason S Morrow
(74) *Attorney, Agent, or Firm* — Sandberg Phoenix & von Gontard P.C.

(57) ABSTRACT

A cargo bed wall that can be disposed at a forward portion of a deck of the cargo bed. In various instances, the wall comprises a back face, a front face, and one or more article stowage structures that is/are structured and operable to receive and retain one or more stowable articles. The article stowage structure(s) can be disposed on the front and/or back face of the wall, and/or, in other instances, the article stowage structure(s) can be disposed within the front and/or back face of the wall.

11 Claims, 10 Drawing Sheets

CARGO BED ARTICLE STOWAGE STRUCTURE

FIELD

The present teachings relate to article storage compartments, bins, pockets, etc., in vehicles, and more particularly article storage compartments, bins, pockets, etc. provided in a wall of a vehicle cargo bed.

BACKGROUND

The statements in this section merely provide background information related to the present disclosure and may not constitute prior art.

Vehicle owners often desire storage compartments, bins, pockets, wells, reservoirs, etc., that are customized, conveniently located, and easily accessible in the vehicle for retaining and storing various personal items (e.g., cell phones, sunglasses, gloves, keys, etc.) and/or handheld tools (e.g., drills, hammers, wrenches, screw drivers, tape measures, etc.), and/or work/personal supplies (e.g., cleaning supplies, aerosol/spray products, first aid supplies, rags/towels, emergency/roadside supplies, etc.). Accordingly, vehicle manufacturers endeavor to utilize previously unutilized space in vehicles to provide such storage. However, the style, structure function of various vehicles can make identification and utilization of such previously unutilized space a challenge. For example, pickup trucks and utility vehicles, such as maintenance vehicles, cargo vehicles, shuttle vehicles, golf carts, all-terrain vehicles (ATVs), utility task vehicles (UTVs), recreational off-highway vehicles (ROVs), side-by-side vehicles (SSV), worksite vehicles, buggies, tactical vehicles, etc. empirically have less available space and structure for such customized storage.

SUMMARY

In various embodiments, the present disclosure provides a cargo bed wall that can be disposed at a forward portion of a deck of the cargo bed. In various instances, the wall comprises a back face, a front face, and one or more article stowage structures that is/are structured and operable to receive and retain one or more stowable articles. The article stowage structure(s) can be disposed on the front and/or back face of the wall, and/or, in other instances, the article stowage structure(s) can be disposed within the front and/or back face of the wall.

In various other embodiments, the present disclosure provides a cargo bed mountable to a chassis and/or other structure of a vehicle, wherein the cargo bed comprises a deck and a front wall disposed at a forward portion of the deck. In various instances the front wall comprises a back face that faces a rear edge of the deck and a front face that faces a passenger compartment of the vehicle to which the cargo deck can be mounted. The front wall additionally comprises one or more article stowage structures that is/are structured and operable to receive and retain one or more stowable articles. In various instances, the article stowage structure(s) can be disposed on the front face of the front wall, and/or, in other instances, the article stowage structure(s) can be disposed within the front face of the front wall.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Referring to FIGS. 1, 2A, 2B and 3, in various embodiments, the present disclosure provides a vehicle 10 that generally includes a passenger compartment 14, and a cargo bed 18. A front wall 20 of or for the cargo bed 18, (as described further below) includes one or more article stowage structures 22 that is/are structured and operable to stow personal items, and/or handheld tools, and/or work items and/or any other items that the vehicle operator may wish to secure in an easily accessible place within the vehicle 10. For example, in various implementations, the article stowage structure(s) 22 can stow, secure and/or retain such stowable articles as cell phones, sunglasses, gloves, keys, drills, hammers, wrenches, screw drivers, tape measures, cleaning supplies, aerosol/spray products, first aid supplies, rags/towels, emergency/roadside supplies, camping equipment, rifles, handguns, bows, etc. The article stowage structure(s) 22 is/are readily accessible from various areas around and adjacent the respective article stowage structure(s) 22. For example, the article stowage structure(s) 22 is/are accessible from outside the vehicle 10 adjacent the respective article stowage structure(s) 22, and from within the passenger compartment 14. That is, in various embodiments, a driver or passenger of the vehicle 10 can access the article stowage structure(s) 22 from within the passenger compartment 14 to easily place and retrieve stowable articles into and from the article stowage structure(s) 22.

Although the cargo bed front wall 20, can comprise one or more article stowage structure 22, for simplicity and clarity, only a single article stowage structure 22 will be described herein with the knowledge that the description and illustrations provided in the present disclosure are applicable to any number of article stowage structures 22 disposed in or on the cargo bed 18. Additionally, although the article stowage structure 22 can be a compartment, bin, pocket, well, reservoir, rack, shelf, drawer, hook, or any other structure suitable to stow, secure and/or retain such stowable articles as those described above, for simplicity and clarity, it will be simply and generically referred to herein as the stowage structure 22. Furthermore, while the description and illustrations of the present disclosure are primarily directed toward a utility vehicle, it should be understood that the features disclosed herein, e.g., the cargo bed 18 comprising the stowage structure 22, can have application to other types of vehicles, such as maintenance vehicles, cargo vehicles, shuttle vehicles, golf carts, all-terrain vehicles (ATVs), utility task vehicles (UTVs), recreational off-highway vehicles (ROVs), side-by-side vehicles (SSV), worksite vehicles, buggies, tactical vehicles, etc., and small/mid-sized/full-sized pickup trucks, and remain within the scope of the present disclosure.

Generally, the vehicle 10 further includes one or more front wheels 26 operationally connected to a chassis 28, one or more rear wheels 30 operationally connected to the chassis 28, a drivetrain 34 operationally connected to at least one of the front and/or rear wheels 26 and/or 30, and at least one prime mover. The prime mover can be one of, or both of, an internal combustion engine (ICE) 38 and an electric motor 42. In various implementations wherein the vehicle 10 includes the ICE 38, the vehicle 10 additionally includes a transmission 46 operably connected to the ICE 38 and structured and operable to receive torque (e.g., motive force) generated by the ICE 34, a driveshaft 50 operatively connected to the transmission 46 and structured and operable to receive torque transferred from the ICE 38, and a first differential 54 operatively connected to the drive shaft 50 and structured and operable to distribute torque received from drive shaft 50 to at least one of the rear wheels 30, via a rear axle 58 (axle 58 can be either a split axle for an independent suspension system, or a one-piece axle). Although the ICE 38 is shown by way of example in FIG. 3 as providing torque to at least one of the rear wheels 30, it is envisioned that the ICE 38 can additionally or alternatively be operationally connected, via the transmission 46, the drive shaft 50 and the first differential 54, to deliver torque to at least one of the front wheels 26.

In various implementations wherein the vehicle 10 includes the electric motor 42, the vehicle 10 additionally includes a second differential 62 operatively connected to the electric motor 42 and structured and operable to receive torque (e.g., motive force) generated by the electric motor 42 and to distribute the torque to at least one of the front wheels 26, via a front axle 66 (axle 66 can be either a split axle for an independent suspension system, or a one-piece axle). Although the electric motor 42 is shown by way of example in FIG. 3 as providing torque to at least one of the front wheels 26, it is envisioned that the electric motor can additionally or alternatively be operationally connected, via the second differential 54, to deliver torque to at least one of the rear wheels 30. It is further envisioned that in yet other embodiments, the vehicle 10 can be configured as a 4-wheel drive vehicle, wherein at least one of the ICE 38 and/or the electric motor 42 is/are operatively connected to the first differential 54, and at least one of the ICE 38 and/or the electric motor 42 is/are operatively connected to the second differential 62 such that the ICE 38 and/or the electric motor 42 deliver torque to at least one front wheel 26 and at least one rear wheel 30. In such 4-wheel drive embodiments, the vehicle 10 can include an additional driveshaft 70 structured and operable to connect the ICE 38 and/or the electric motor 42 to the respective other first or second differential 54 or 62.

Figure 3:
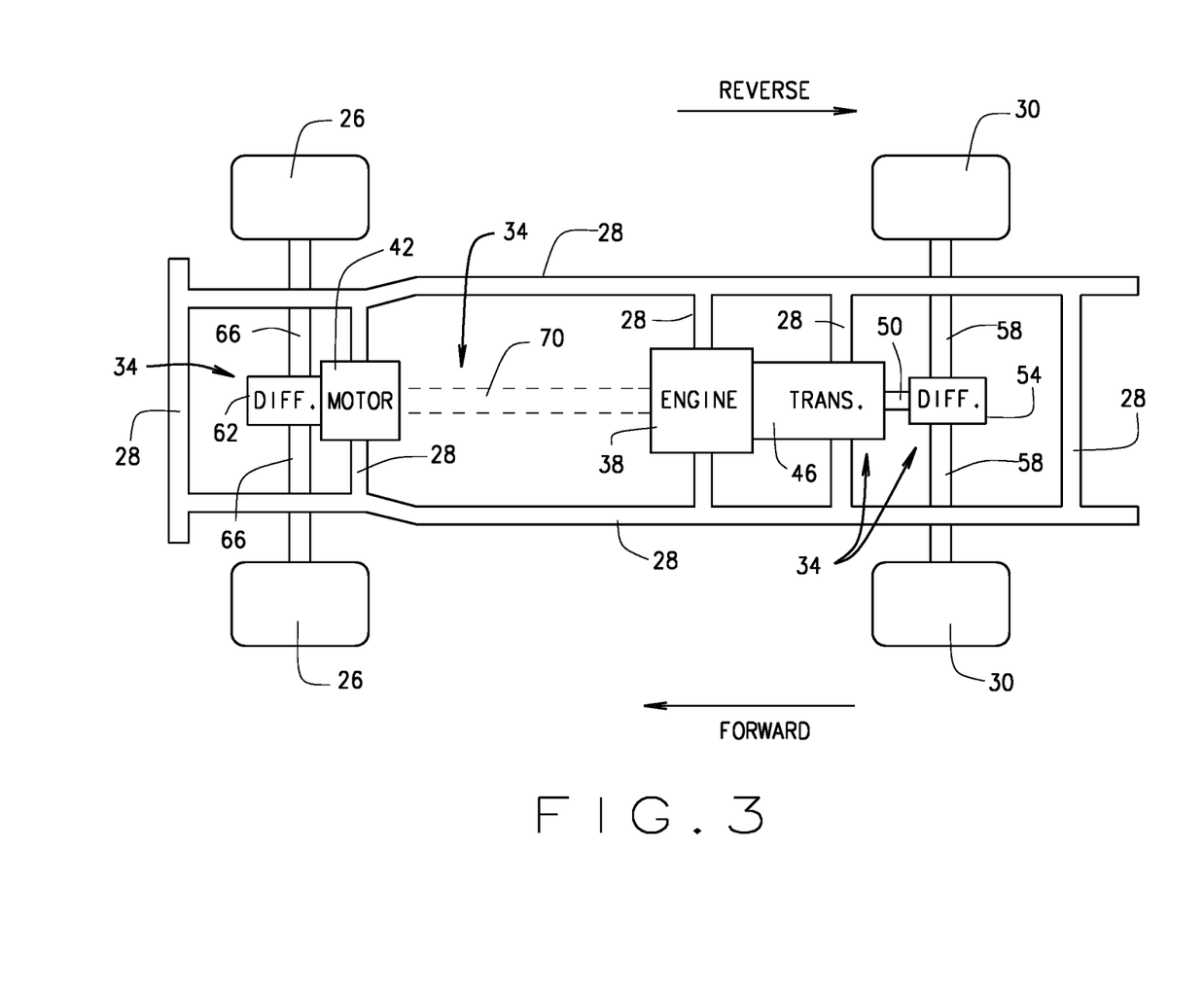
FIG. 3 is a schematic of a chassis and drivetrain of the vehicle shown in FIG. 1, in accordance with various embodiments of the present disclosure.

As used herein, based on the particular configuration of the prime mover of the vehicle 10, that is, based on whether the vehicle 10 includes just the ICE 38, just the electric motor 42, both the ICE 38 and the electric motor 42, and whether the vehicle 10 is configured as a 2-wheel drive vehicle or a 4-drive vehicle, the drivetrain 34 can comprise any or all of, individually or in any combination, the transmission 46, the drive shaft 50, the first differential 54, the rear axle 58, the second differential 62, front axle 66, and the additional drive shaft 70.

Figure 1:
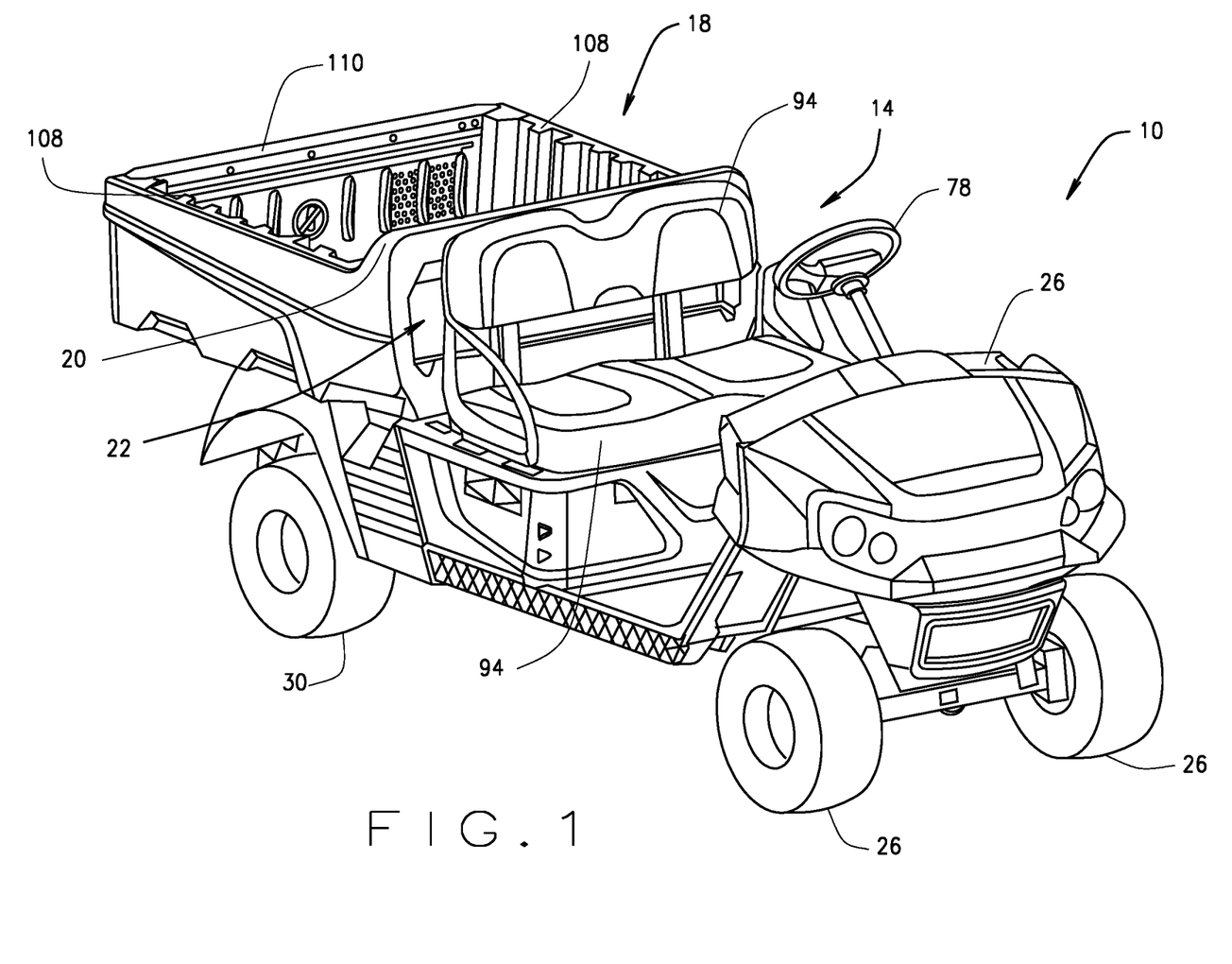
FIG. 1 is an isometric view of a vehicle having an article stowage feature provided in a cargo bed of the vehicle, in accordance with various embodiments of the present disclosure.
Figure 2A:
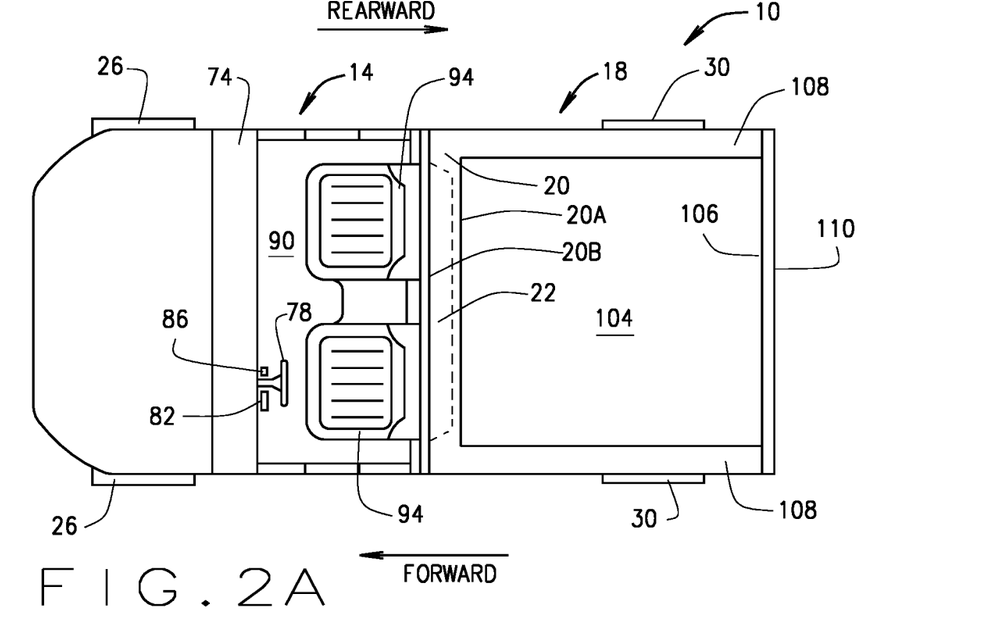
FIG. 2A is a schematic of a top view of the vehicle shown in FIG. 1, in accordance with various embodiments of the present disclosure.
Figure 2B:
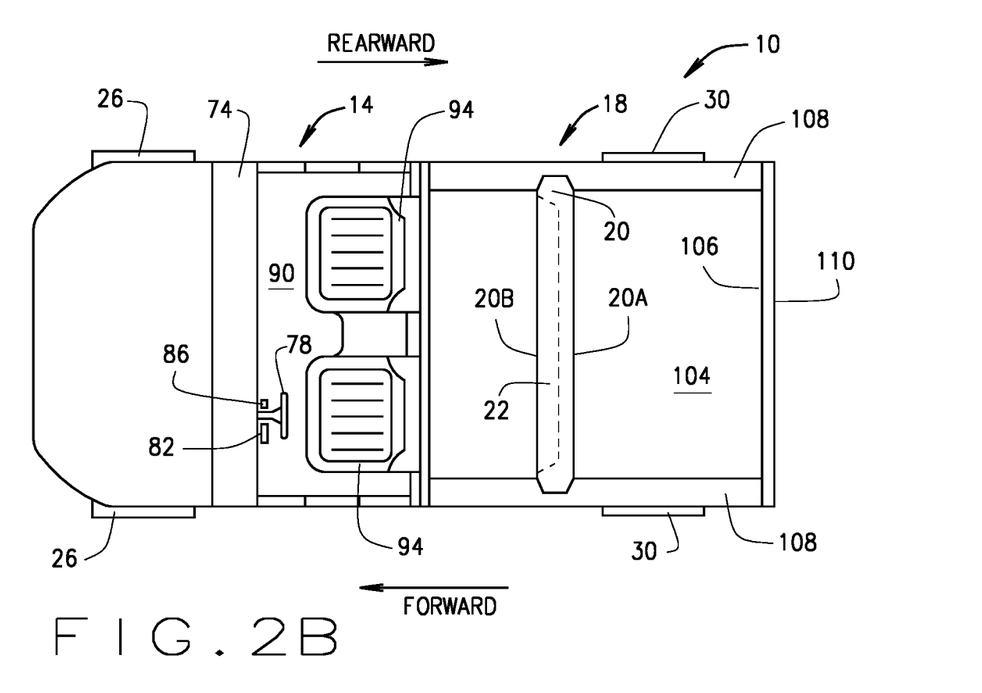
FIG. 2B is a schematic of a top view of the vehicle shown in FIG. 1, in accordance with various other embodiments of the present disclosure.

The passenger compartment 14 generally includes: a dash console 74 that can include such things an On/Off key switch, a forward/neutral/reverse selector, a 2-wheel drive/4-wheel drive selector, one or more small accessory storage pockets, a speedometer, various other gauges and/or instrumentation, a radio, and/or various other vehicle controls; a steering wheel 78 for use by the vehicle operator to control the directional movement of the vehicle 10; a brake pedal 82 for use by the vehicle operator to control slowing and stopping of the vehicle 10; an accelerator pedal 86 for use by the vehicle operator to control the torque delivered by one or more prime mover to one or more of the front and/or rear wheels 26 and/or 30; a floorboard 90; and a passenger seating structure 94 for supporting one or more passengers of the vehicle 10 (e.g., a driver and one or more non-drivers). The seating structure 94 can be any suitable seating structure, for example, a bench style seat or one or more side-by-side seats. The seating structure 94 comprises at least one seat bottom and at least one seat back. Each seat back includes a front face (or side) that faces the front of the vehicle 10, against which the vehicle passenger(s) lean(s) when seated on the respective seat bottom, and an opposing rear face (or side) that faces the rear of the vehicle 10. Additionally, in various embodiments, the vehicle 10 can include two or more laterally (with regard to a longitudinal axis of the vehicle 10 spaced independent seating structures 94, e.g., a front seating structure 94 and one or more rear seating structures 94.

In various embodiments, the vehicle 10 can further include a roll over protection system (ROPS) (not shown) that is disposed above and around the passenger compartment 14 and is structured and operable to protect passengers within the passenger compartment 14 in a situation where the vehicle 10 may be caused to overturn, flip or roll over.

The cargo bed 18 is designed and used for hauling various payloads such as gravel, rock, soil, debris, garbage, wood, etc., and/or larger tools and equipment such as shovels, rakes, wheelbarrows, lawn mowers, chain saws, other motorized equipment, etc. In various implementations, the cargo bed 18 can be a fixed or stationary bed, wherein the cargo bed 18 is fixedly connected to a chassis 26 and/or other frame structure of the vehicle 10, while in other implementations the cargo bed 18 can be a lift or dump bed, wherein the vehicle 10 includes a lift mechanism (not shown) that is operable to lift a front portion of the cargo bed 18 (i.e., the portion of the cargo bed 18 nearest the passenger compartment 14) in order to dump or easily extract items or materials from the cargo bed 18. The cargo bed 18 generally comprises the front wall or panel 20, and a deck 104. The front wall 20 is disposed or disposable at a forward portion of the deck 104 (e.g., the front wall 20 can be fixedly disposed or movably disposed at the forward portion of the deck 104). The front portion of the deck 104 being defined herein as any portion of the deck 104 forward of a rear edge 106 of the deck 104. In various embodiments, the front wall 20 can be fixed to the deck 104, e.g., integrally formed with the deck 104, bolted to the deck 104, welded to the deck 104, etc., In various other embodiments, the front wall 20 can be movable such that it can be selectively disposed anywhere along the front portion of the deck 104. For example, the deck 104 can comprise a plurality of slots or channels that at least a portion of the front wall 20 can be disposed in to selectively position the front wall 20 at various places along the forward portion of the deck 104. Additionally, it is envisioned that in various embodiments, the front wall 20 can be providedin form of a utility box, or any other accessory, device, or structure, disposed at the forward portion of the deck.

Moreover, in some embodiments, the cargo bed 18 and/or the front wall 20 is disposed relative to the passenger compartment 14 such that there is a stowage structure access space between the rear portion of the passenger compartment 14 and a front side 20B of the front wall that provides easy access from generally any direction or angle to the stowage structure 22. For example, in various embodiments, the stowage structure access space can be between 4 inches and 24 inches, or greater, e.g., between 10 inches and 16 inches.

As used herein, the word "forward" and the phrase "forward of" are used to describe the direction from a named component or structure toward the front of the vehicle 10 along a longitudinal axis of the vehicle 10. Similarly, as used herein, the word "rearward" and the phrase "rearward of" are used to describe the direction from a named component or structure toward the rear of the vehicle 10 along a longitudinal axis of the vehicle 10.

The front wall 20 can be fabricated of any suitable material such as plastic, nylon, fiberglass, polycarbonate, metal (e.g., aluminum, steel, titanium, a combination or alloy of multiple metals, etc.), some combination thereof and/or the like and can be cast, stamped, moulded, milled, extruded, etc., or any combination thereof. Similarly, the deck 104 can be fabricated of any suitable material such as plastic, nylon, fiberglass, polycarbonate, or metal (e.g., aluminum, steel, iron, titanium, a combination or ally or multiple metals, etc.), some combination thereof, and/or the like and can be cast, stamped, moulded, milled, extruded, etc., or any combination thereof.

In various embodiments, the cargo bed 18 can additionally include a pair of opposing side walls or panels 108 and/or a rear wall or panel 110. In various embodiments, the rear wall 110 can be a tailgate structured and operable to Open and Close to provide access to the deck 104. The side walls 108 can be connected, attached or mounted to the deck 104 and/or front wall 20, or can be integrally formed with the deck 104 and/or front wall 20. Additionally, the side walls 108 can be fabricated of any suitable material such as plastic, nylon, fiberglass, polycarbonate, metal (e.g., aluminum, steel, iron, titanium, a combination or alloy of multiple metals, etc.), some combination thereof, and/or the like, and can be cast, stamped, moulded, milled, extruded, etc., or any combination thereof.

Referring now to FIGS. 1, 2A, 2B, 4 and 5, the front wall 20 of the cargo bed 18 includes a back side, face or surface 20A that faces toward the rear edge 106 of the deck 104 when the front wall 20 is disposed on the deck 104, and a front side, face or surface 20B that faces the passenger compartment 14 when the front wall 20 is disposed on the deck 104. In various embodiments, the stowage structure 22 can be disposed within the front face 20B (e.g., the stowage structure 22 extends into an internal space of the front wall 20 defined between the rear face 20A and the front face 20B), as illustrated by way of example in FIG. 4. Alternatively, in various other embodiments, the stowage structure 22 can be disposed on the front face 20B (e.g., the stowage structure 22 extends outward and away from the front face 20B toward the passenger compartment 14), as illustrated by way of example in FIG. 5A. Further yet, it is envisioned that in various embodiments, the article stowage structure 22 can comprise a slide-out or fold-out drawer or bin disposed on or within the front face 20B of the front wall 20, as illustrated by way of example in FIG. 5B.

In the various embodiments wherein the stowage structure 22 is disposed within the front face 20B of the front wall 20 (e.g., FIG. 4), the stowage structure 22 can be integrally formed within the front face 20B, e.g., moulded, milled, stamped or extruded within the front face 20B. Alternatively, the stowage structure 22 can be an independent structure that is placed within an opening formed in the front face 20B and thereafter secured to the front face 20B, within the opening, via rivets, welding, soldering, an adhesive, screws, bolts, etc. In the various embodiments wherein the stowage structure 22 is disposed within the front face 20B, the stowage structure 22 provides a cavity within the front wall 20 that includes a bottom surface 114, opposing side walls 118 and a back wall 122 such that stowable articles can be placed within the cavity and set on, or at least partially supported by, the bottom surface 114. The bottom surface 114, side walls 118 and back wall 122 can have any desired shape, height and width to provide stowage space having any desired shape and volume. In various instances, the bottom surface 114 can be concave to provide a reservoir or trough in which the stowable article(s) can be disposed. For example, in some such embodiments, a base of at least a portion of the bottom surface 114 can be lower than a bottom portion of the opening of the cavity that is accessible through the front face 20B. In such embodiments, this provides a retaining wall whereby objects placed on the concave bottom surface 114 can be retained by a forward half wall/lip/ridge where the base of the opening is at a higher level than the concave portion of the bottom surface 114.

Similarly, in the various embodiments wherein the stowage structure 22 is disposed on the front face 20B of the front wall 20 (e.g., FIG. 5A), the stowage structure 22 can be integrally formed on the front face 20B, e.g., moulded, milled, stamped or extruded to protrude from the front face 20B. Alternatively, the stowage structure 22 can be an independent structure that is positioned on the front face 20B and thereafter secured to the front face 20B, via rivets, welding, soldering, an adhesive, screws, bolts, etc. In the various embodiments wherein the stowage structure 22 is disposed on the front face 20B, the stowage structure 22 provides a shelf, pocket, basket, or rack that protrudes or extends from the front wall 20 and includes a bottom surface 126, opposing side walls 130, a front wall 134 and a back wall 136 such that objects can be placed within the shelf, pocket, basket, or rack and set on, at least partially supported by, the bottom surface 126. The bottom surface 126, side walls 130 and front wall 134 can have any desired shape, height and width to provide stowage space having any desired shape and volume. In various instances, the bottom surface 126 can be concave to provide a reservoir or trough in which the stowable article(s) can be disposed.

Figure 5A:
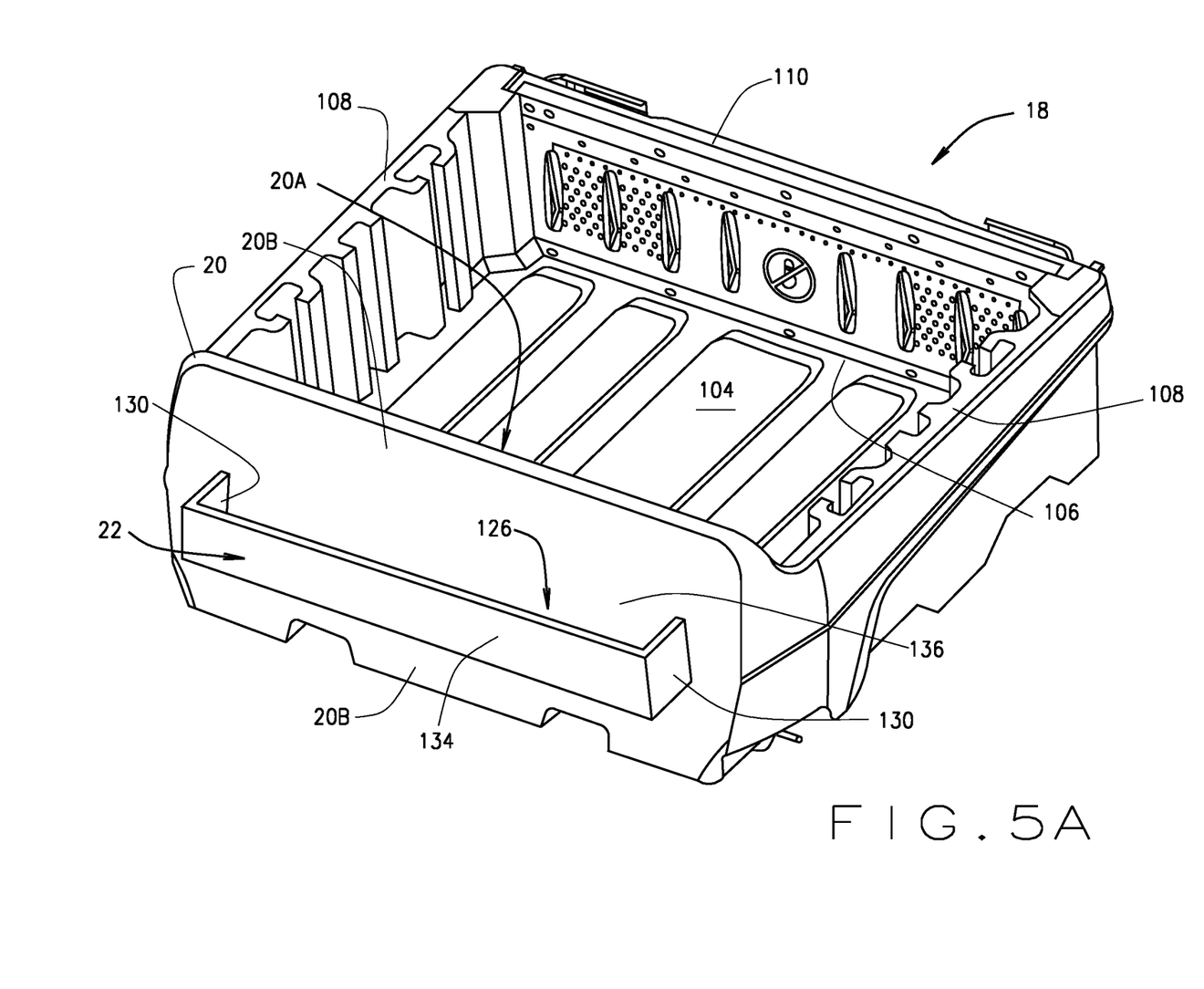
FIG. 5A is an isometric view of a cargo bed including the article stowage feature shown in FIG. 1 disposed on the front face of the front wall of the cargo bed, in accordance with various other embodiments of the present disclosure.
Figure 5B:
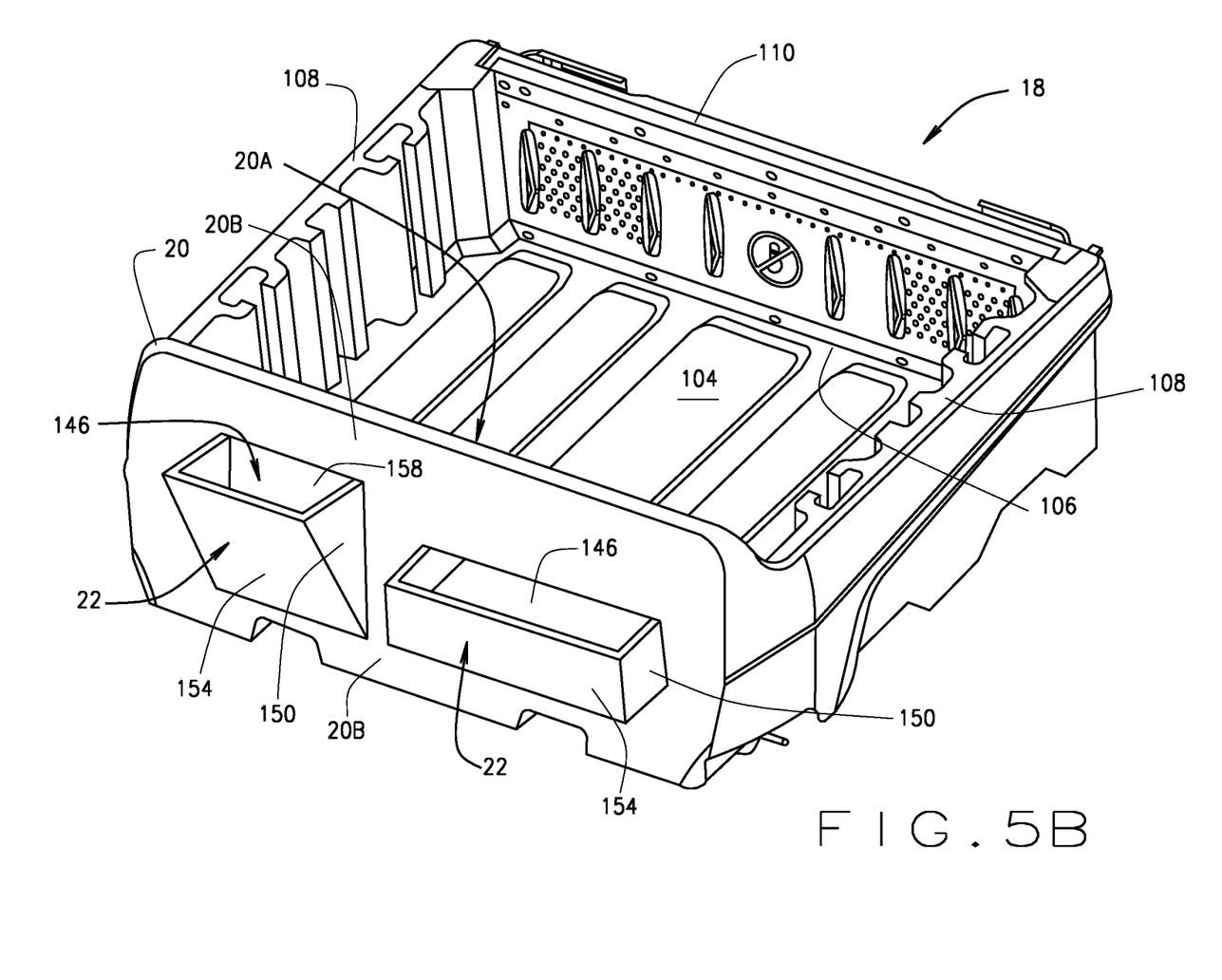
FIG. 5B is an isometric view of a cargo bed including the article stowage feature shown in FIG. 1 disposed on the front face of the front wall of the cargo bed, in accordance with yet other embodiments of the present disclosure.
Figure 6:
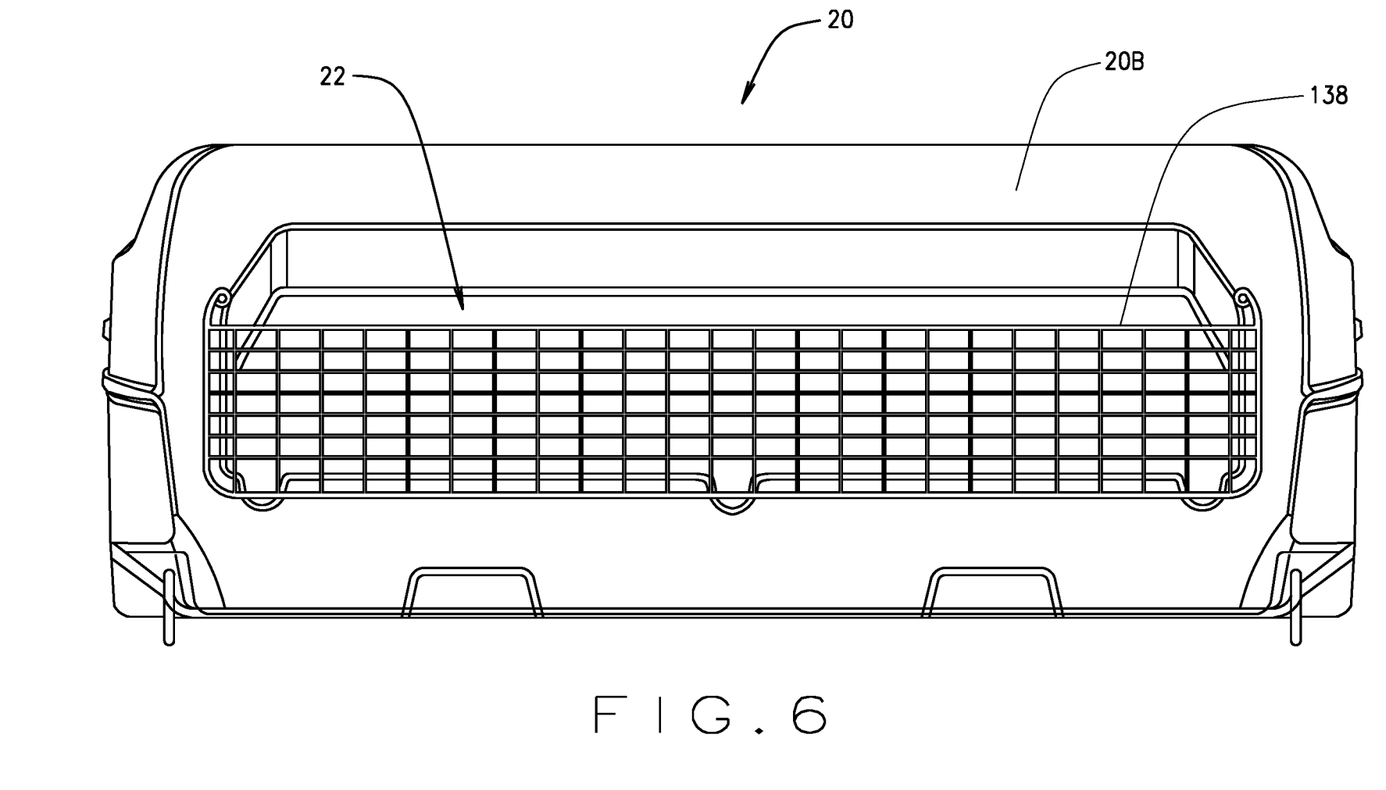
FIG. 6 is a front view of a front wall of the cargo bed, wherein the article stowage structure is provided in the front face of the front wall and includes an article retention device, in accordance with various embodiments of the present disclosure.

Additionally, in the various embodiments wherein the stowage structure 22 is disposed on the front face 20B, the bottom surface 126, side walls 130 and front wall 134 can be fabricated of any desired material or combination of materials and can be solid or have openings therein. For example, in various embodiments, one or more of the bottom surface 126, side walls 130 and front wall 134 can be solid, for example, moulded, milled or extruded from any desired plastic or metal. Alternatively, in various embodiments, one or more of the bottom surface 126, side walls 130 and front wall 134 can comprise one or more aperture, e.g., one or more opening, hole or window. For example, in various embodiments, one or more of the bottom surface 126, side walls 130 and front wall 134 can be moulded, milled or extruded from any desired plastic or metal to provide a lattice-like bottom surface 126, and/or side wall 130 and/or front wall 134. Alternatively, one or more of the bottom surface 126, side walls 130 and front wall 134 can comprise a frame (e.g., wire frame) having fabric, mesh, netting or woven strips disposed over the frame(s).

Similarly, in the various embodiments wherein the stowage structure 22 comprises a bin or drawer disposed on or within the front face 20B of the front wall 20 (e.g., FIG. 5B), the bin or drawer stowage structure 22 includes a bottom surface 146, opposing side walls 150, a front wall 154, and a back wall 158 such that stowable articles can be placed within the bin or drawer stowage structure 22 and set on, at least partially supported by, the bottom surface 146. In such instances, the bin or drawer stowage structure 22 can have any desired shape, height, width and depth to provide stowage space having any desired shape and volume.

Furthermore, it is envisioned that in various embodiments, the stowage structure 22 can comprise a first portion that is disposed within the front face 20B to provide a portion that is recessed within the front wall 20 (as described above with regard to FIG. 4), and a second portion that is disposed on the front face 20B to provide a portion that protrudes from the front face 20B (as described above with regard to FIG. 5A). In such instances, the second portion is disposed over at least a portion of the first portion to provide and define the stowage structure 22 wherein stowable articles can be placed, retained and secured.

As described above, the stowage structure 22 is structured and operable to stow various items, article and objects such as personal items, and/or handheld tools, and/or work items and/or personal items that the vehicle operator may wish to secure in an easily accessible place within the vehicle 10. For example, the article stowage structure 22 can stow, secure and/or retain such things as cell phones, sunglasses, gloves, keys, drills, hammers, wrenches, screw drivers, tape measures, cleaning supplies, aerosol/spray products, first aid supplies, rags/towels, emergency/roadside supplies, camping equipment, rifles, handguns, bows, etc.

Referring now to FIGS. 4 through 9, in various embodiments, the cargo bed 18 and/or stowage structure 22 can include one or more article retention device 138 structured and operable to retain at least one stowable article within the article stowage structure. The article retention device(s) 138 can comprise any device, apparatus, fixture, or mechanism suitable for retaining and/or securing one or more stowable article within the stowage structure 22 regardless of movement of the cargo bed 18. That is, the article retention device(s) 138 can comprise any device, fixture, apparatus, or mechanism suitable for retaining and/or securing one or more stowable article within the stowage structure 22 as the vehicle 10 is operated over various terrains causing the vehicle 10 and the cargo bed 18 rock, bounce, sway, vibrate and/or be jostled. Furthermore, in the embodiments where the cargo bed 18 is lift or dump bed, the article retention device(s) 138 can comprise any device, fixture, apparatus, or mechanism suitable for retaining and/or securing one or more stowable article within the stowage structure 22 as the cargo bed is raised and lowered and otherwise moved.

Figure 4:
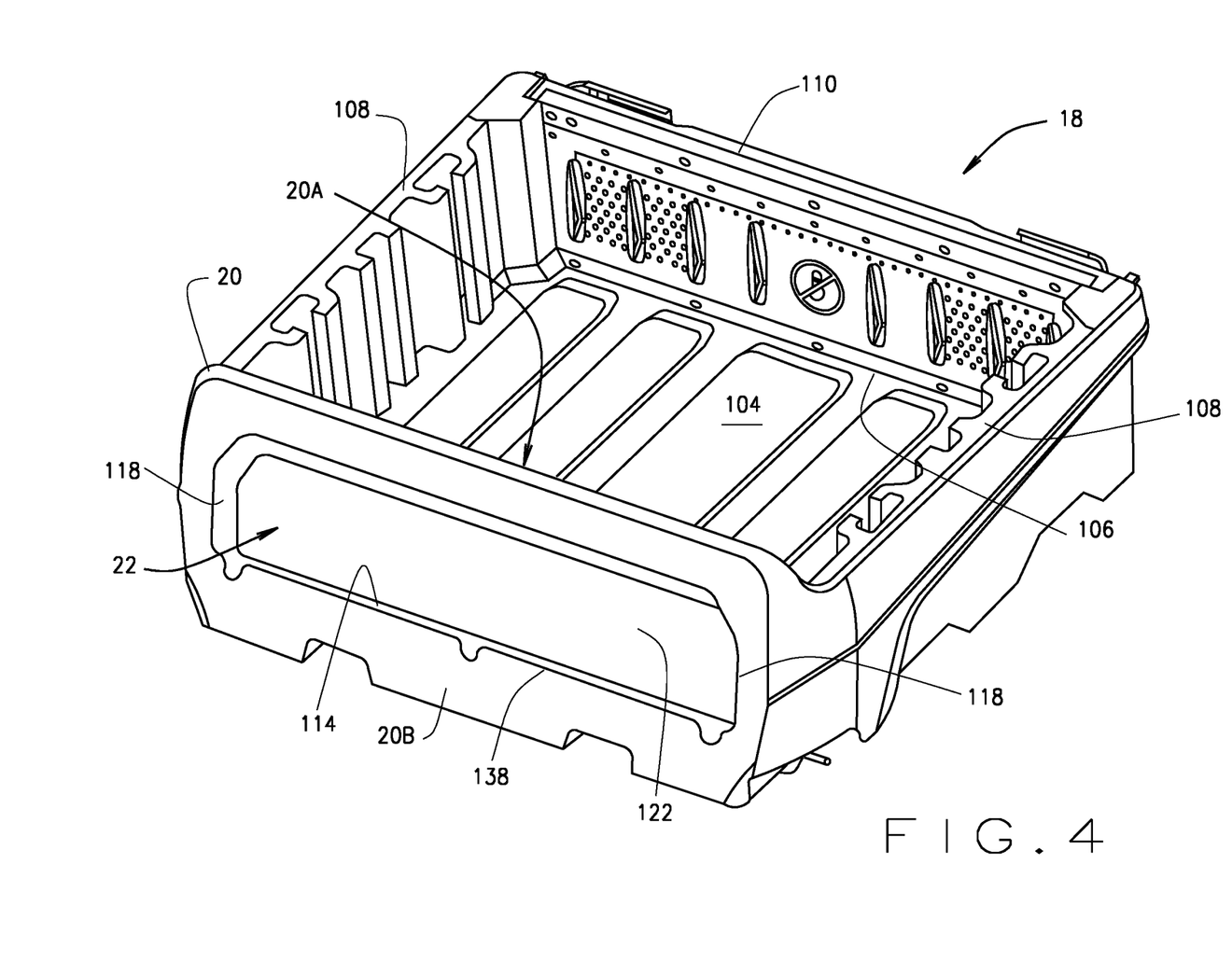
FIG. 4 is an isometric view of a cargo bed including the article stowage feature shown in FIG. 1 disposed within a front face of a front wall of the cargo bed, in accordance with various embodiments of the present disclosure.
Figure 7:
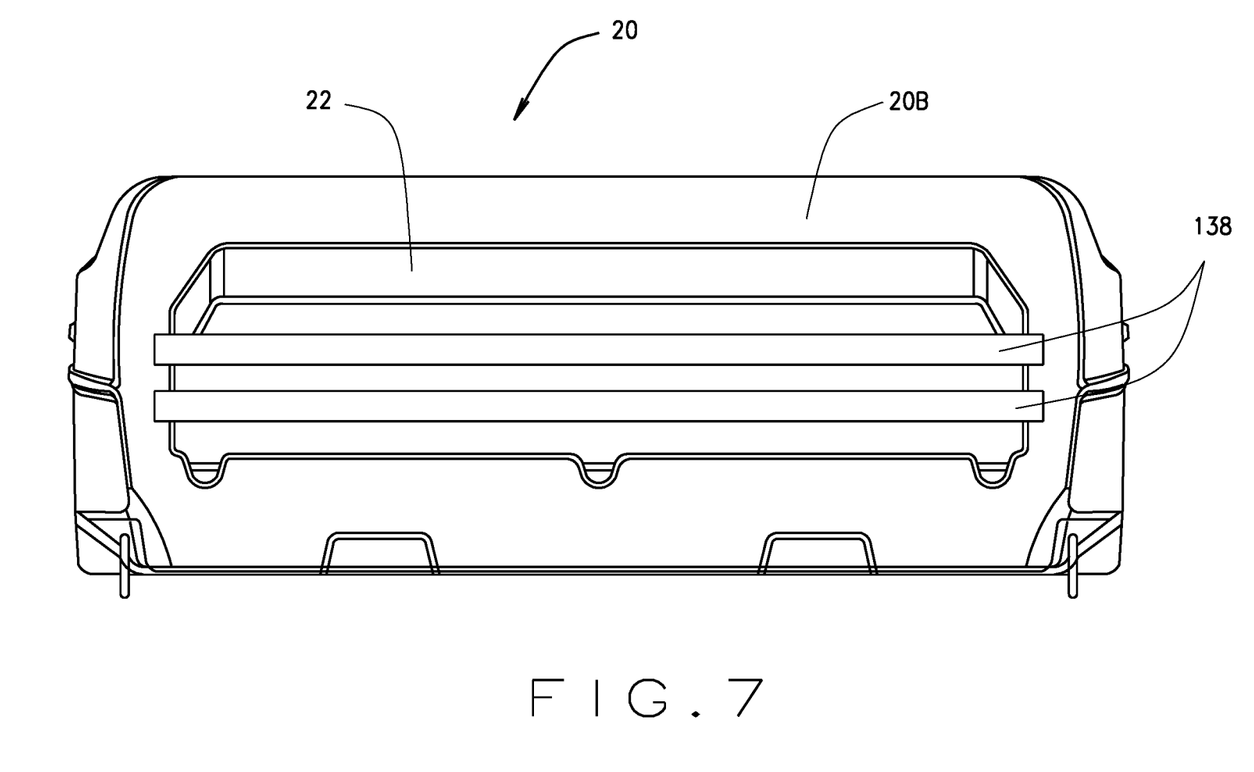
FIG. 7 is a front view of a front wall of the cargo bed, wherein the article stowage structure is provided in the front face of the front wall and includes an article retention device, in accordance with various other embodiments of the present disclosure.

For example, as illustrated in FIG. 4, in various embodiments the article retention device 138 can comprise a raise lip or ledge disposed, attached or formed along at least apportion of an outer edge of the bottom surface 114 of the stowage structure 22. Alternatively, in various other embodiments, as illustrated by way of example in FIG. 6, the article retention device 138 can comprise a net, fence, grid, or grate disposed, attached or formed across at least a portion of the stowage structure 22. In such instances, the net, fence, grid, or grate retention device 138 can be fabricated of metal wire, elastic cord, nylon cord, cotton cord, plastic cord, etc. In yet other embodiments, the retention device 138 can comprise interlaced, connected or integrally formed metal, elastic, nylon, cotton, plastic, etc. strips or straps to form a lattice-like retention device 138 disposed, attached or formed across at least a portion of the stowage structure 22. As a further example, as illustrated in FIG. 7, in various embodiments the article retention device 138 can comprise one or more bars and/or straps disposed across at least a portion of the stowage structure 22. In such instances, the bar(s) and/or strap(s) retention device 138 can be fabricated of metal, elastic, nylon, cotton, plastic, etc.

Figure 8:
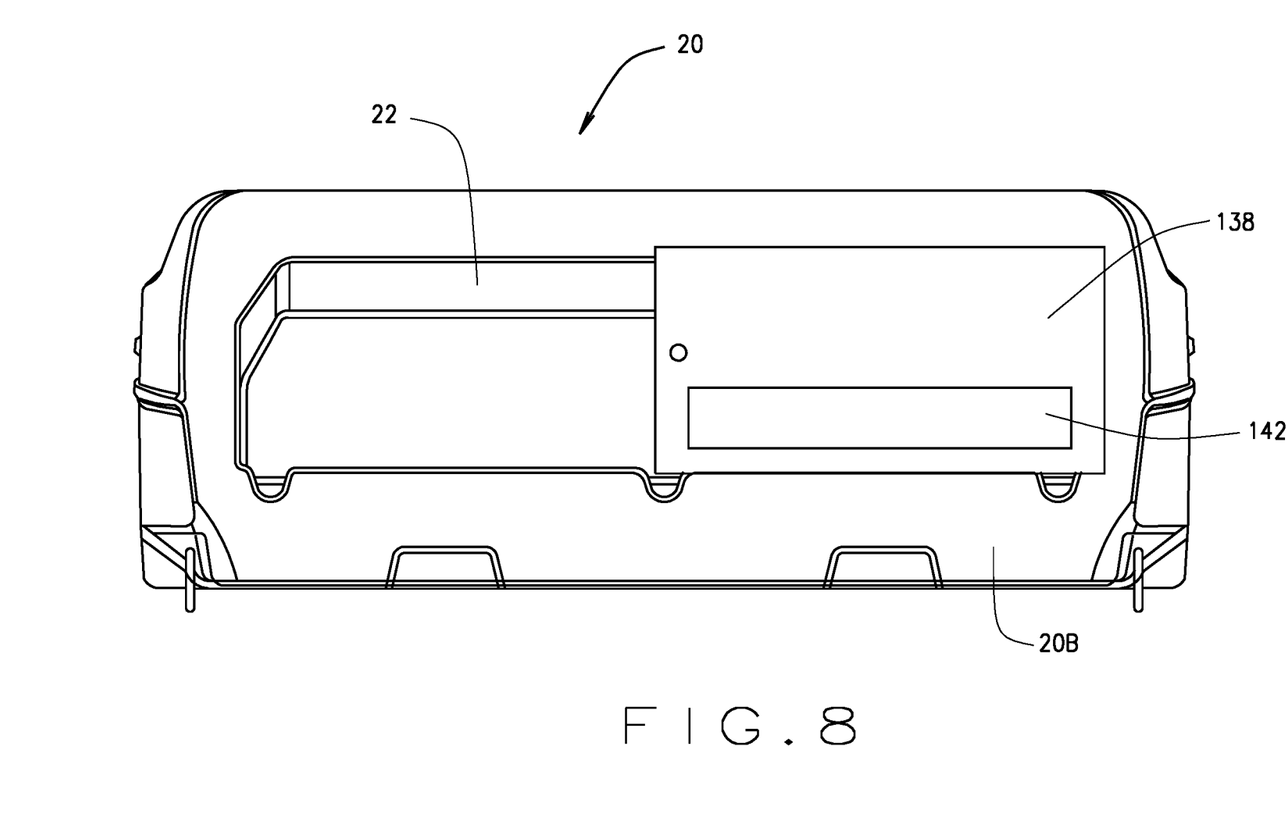
FIG. 8 is a front view of a front wall of the cargo bed, wherein the article stowage structure is provided in the front face of the front wall and includes an article retention device, in accordance with yet other various embodiments of the present disclosure.

As a still further example, as illustrated in FIG. 8, in various embodiments the article retention device 138 can comprise one or more door or panel that are slidingly or hingedly connected to the front wall front face 20B and disposed across at least a portion of the stowage structure 22. In such instances, the door(s) or panel(s) retention device(s) 138 can be of any suitable construction, for example, they can be solid door(s)/panel(s), perforated door(s)/panel(s), windowed door(s)/panel(s), louvered door(s)/panel(s), foldable accordion-like door(s)/panel(s), a plurality of telescoping door(s)/panel(s), etc. Still yet further, in various embodiments wherein the retention device 138 comprise one or more door or panel, the door(s)/panel(s) can have an auxiliary article stowage structure 142 (similar to that illustrated in FIG. 5A and described above) disposed on, attached to, or integrally formed with the door(s)/panel(s) retention device 138.

Figure 9:
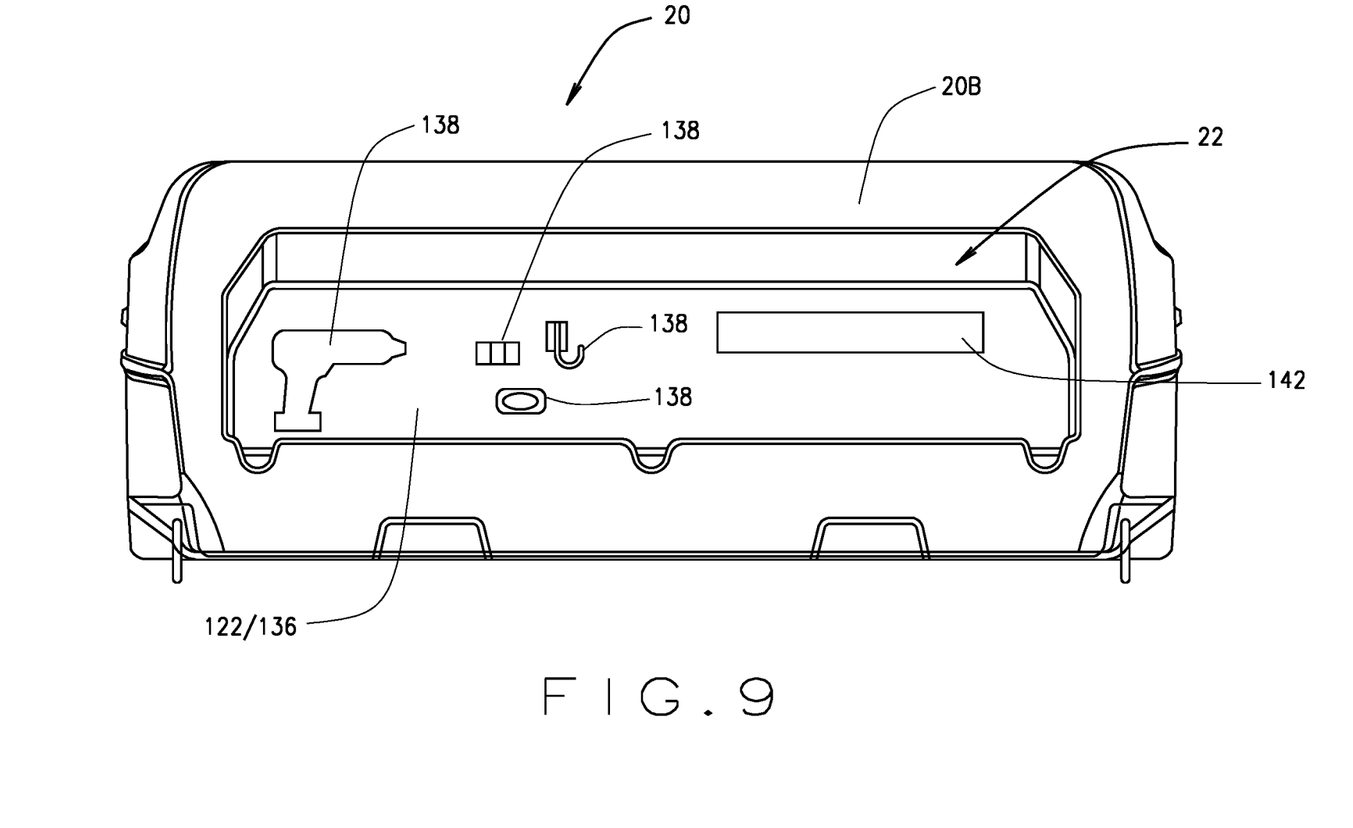
FIG. 9 is a front view of a front wall of the cargo bed, wherein the article stowage structure is provided in the front face of the front wall and includes an article retention device, in accordance with still yet other various embodiments of the present disclosure.

As a still yet further example, as illustrated in FIG. 9, in various embodiments the article retention device 138 can be any hook, latch, clasp, loop, tool specific profiled detent, or any other fixture disposed on, attached to, or integrally formed with the back wall 122/136 of the stowage structure 22. Still even further yet, in various embodiments, the stowage structure 22 can have an auxiliary article stowage structure 142 (similar to that illustrated in FIG. 5A and described above) disposed on, attached to, or integrally formed back wall 122/136 of the stowage structure 22.

Although the article stowage structure 22 has been described herein as being disposed on or within the front side or face 20B of the front wall 20, it is envisioned that the cargo bed 18 can additionally, or instead, comprise one or more article stowage structures 22 (as described above) disposed on or within the back side or face 20A of the front wall 20, and/or disposed on or within any side or face of the side wall(s) 108, and/or disposed on or within any side or face of the rear wall 110, and remain within the scope of the present disclosure.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A cargo bed wall disposable at a forward portion of a deck of a cargo bed, said wall comprising:
   a back face;
   a front face; and
   at least one article stowage structure structured and operable to receive and retain one or more stowable articles, wherein at least one of the front face and back face comprises the at least one article stowage structure, the at least one article stowage structure comprising:

a cavity disposed within the at least one of the front face and the back face of the wall that includes a bottom surface, opposing side walls and a back wall such that stowable articles can be placed within the cavity and at least partially supported by the bottom surface.

2. The cargo bed wall of claim 1 further comprising a retention device disposed on the at least one of the front face and the back face of the wall, the retention device structured and operable to retain at least one stowable article within the at least one article stowage structure.

3. The cargo bed wall of claim 2, wherein the retention device comprises at least one of:
   a lip disposed along at least a portion of a bottom edge of the at least one article stowage structure;
   at least one bar disposed across at least a portion of the at least one article stowage structure;
   at least one strap disposed across at least a portion of the at least one article stowage structure;
   a door disposed across at least a portion of the at least one article stowage structure;
   a net disposed across at least a portion of the at least one article stowage structure; and
   at least one custom fixture structured and operable to retain a single stowable article.

4. The cargo bed wall of claim 1, wherein the wall comprises a cargo bed front wall disposable at a plurality of locations of the forward portion of the deck.

5. A cargo bed for a vehicle, said cargo bed comprising:
   a deck; and
   a wall comprising:
      a back face;
      a front face; and
      at least one article stowage structure structured and operable to receive and retain one or more stowable articles, wherein at least one of the front face and back face comprises the at least one article stowage structure, the at least one article stowage structure comprising:
         a cavity disposed within the at least one of the front face and the back face of the wall that includes a bottom surface, opposing side walls and a back wall such that stowable articles can be placed within the cavity and at least partially supported by the bottom surface.

6. The cargo bed of claim 5, wherein the wall further comprising a retention device disposed on the at least one of the front face and the back face of the wall, the retention device structured and operable to retain at least one stowable article within the at least one article stowage structure.

7. The cargo bed of claim 6, wherein the retention device comprises at least one of:
   a lip disposed along at least a portion of a bottom edge of the at least one article stowage structure;
   at least one bar disposed across at least a portion of the at least one article stowage structure;
   at least one strap disposed across at least a portion of the at least one article stowage structure;
   a door disposed across at least a portion of the at least one article stowage structure;
   a net disposed across at least a portion of the at least one article stowage structure; and
   at least one custom fixture structured and operable to retain a single stowable article.

8. The cargo bed of claim 5, wherein the wall comprises a front wall of the cargo bed and is disposable at a plurality of locations of the forward portion of the deck.

9. A vehicle, said vehicle comprising:
   a chassis;
   a passenger compartment supported by the chassis; and
   a cargo bed supported by the chassis and structured and operable to hold a payload, the cargo bed comprising:
      a deck; and
      a front wall disposed at a forward portion of the deck, the front wall comprising:
         a back face structured to face a rear edge of the deck;
         a front face structured to face the passenger compartment; and
         at least one article stowage structure structured and operable to receive and retain one or more stowable articles, wherein at least one of the front face and back face comprises the at least one article stowage structure, the at least one article stowage structure comprising:
            a cavity disposed within the at least one of the front face and the back face of the front wall that includes a bottom surface, opposing side walls and a back wall such that stowable articles can be placed within the cavity and at least partially supported by the bottom surface.

10. The vehicle of claim 9, wherein the front wall further comprising a retention device disposed on the at least one of the front face and the back face of the wall, the retention device structured and operable to retain at least one stowable article within the article stowage structure, the retention device comprising at least one of:
   a lip disposed along at least a portion of a bottom edge of the article stowage structure;
   at least one bar disposed across at least a portion of the article stowage structure;
   at least one strap disposed across at least a portion of the article stowage structure;
   a door disposed across at least a portion of the article stowage structure;
   a net disposed across at least a portion of the article stowage structure; and
   at least one custom fixture structured and operable to retain a single stowable article.

11. The cargo bed of claim 9, wherein the front wall is structured and operable to be disposed at a plurality of locations of the forward portion of the deck.

* * * * *